United States Patent
Shen et al.

(10) Patent No.: US 9,825,777 B2
(45) Date of Patent: Nov. 21, 2017

(54) VIRTUAL PRIVATE NETWORK FORWARDING AND NEXTHOP TO TRANSPORT MAPPING SCHEME

(71) Applicant: CISCO TECHNOLOGY, INC., San Jose, CA (US)

(72) Inventors: Naiming Shen, Santa Clara, CA (US); Jun Zhuang, Palo Alto, CA (US); Enke Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 247 days.

(21) Appl. No.: 14/747,831

(22) Filed: Jun. 23, 2015

(65) Prior Publication Data
US 2016/0380823 A1    Dec. 29, 2016

(51) Int. Cl.
*H04L 12/28* (2006.01)
*H04L 12/46* (2006.01)
*H04L 12/701* (2013.01)
*H04L 29/12* (2006.01)

(52) U.S. Cl.
CPC ...... *H04L 12/4633* (2013.01); *H04L 12/4675* (2013.01); *H04L 45/00* (2013.01); *H04L 61/2514* (2013.01); *H04L 61/2592* (2013.01); *H04L 61/6068* (2013.01)

(58) Field of Classification Search
USPC .............. 370/229, 252, 254, 351, 392, 401
See application file for complete search history.

(56) References Cited

U.S. PATENT DOCUMENTS

| 6,810,417 | B2* | 10/2004 | Lee | .......... | H04L 29/06 |
| | | | | | 370/351 |
| 7,185,107 | B1* | 2/2007 | Cassar | ............ | H04L 61/6068 |
| | | | | | 370/346 |
| 7,596,123 | B2 | 9/2009 | Periyalwar et al. | | |
| 8,837,491 | B2 | 9/2014 | Huynh et al. | | |
| 2004/0034702 | A1* | 2/2004 | He | ............ | H04L 12/4633 |
| | | | | | 709/224 |
| 2009/0157901 | A1* | 6/2009 | Asati | ............ | H04L 29/12386 |
| | | | | | 709/238 |
| 2009/0304003 | A1 | 12/2009 | Huynh et al. | | |
| 2011/0149979 | A1* | 6/2011 | Uttaro | ............ | H04L 45/04 |
| | | | | | 370/401 |
| 2013/0230049 | A1* | 9/2013 | Zeng | ............ | H04L 45/745 |
| | | | | | 370/392 |

(Continued)

OTHER PUBLICATIONS

Farinacci, et al., "LISP Canonical Address Format (LCAF)," Network Working Group, Apr. 3, 2015, 36 pages; https://tools.ietf.org/pdf/draft-ietf-lisp-lcaf-08.pdf.

(Continued)

*Primary Examiner* — Kwang B Yao
*Assistant Examiner* — Nguyen Ngo (57) ABSTRACT

A method is provided in one example embodiment and includes configuring on a network element a first tunnel from the network element to a first network, wherein the configuring comprises mapping a nexthop address of the local network element to a transport address of the tunnel on the network to create a first nexthop-to-transport mapping for the network element; and advertising the first nexthop-to-transport mapping along with routing information for the network element to remote network elements.

20 Claims, 8 Drawing Sheets

(56) References Cited

U.S. PATENT DOCUMENTS

2014/0146664 A1* 5/2014 Amante ................. H04L 45/50
370/228
2015/0010008 A1 1/2015 Huynh et al.
2015/0103746 A1* 4/2015 Matsushima ......... H04W 40/02
370/328
2015/0312055 A1* 10/2015 Varga ................. H04L 12/4641
370/254

OTHER PUBLICATIONS

Cisco Systems, Inc., "Dynamic Multipoint VPN" Configuration Guide, Cisco IOS Release 12.4, Oct. 14, 2011, 51 pages; http://www.cisco.com/c/en/us/td/docs/ios-xml/ios/sec_conn_dmvpn/configuration/12-4/sec-conn-dmvpn-12-4-book/sec-conn-dmvpn-dmvpn.pdf.

Mohapatra, et al., "The BGP Encapsulation of Subsequent Address Family Identifier (SAFI) and the BGP Tunnel Encapsulation Attribute," Network Working Group, RFC 5512, Apr. 2009, 13 pages; https://tools.ietf.org/pdf/rfc5512.pdf.

* cited by examiner

```
!
interface loopback 0
 description Border Router 2
 ipv4 address 192.168.1.2 255.255.255.255
!
interface gigabitethernet 1/1/1/0
 description Internet connection network GREEN
 ipv4 address 164.1.2.1 255.255.255.252
!
interface gigabitethernet 2/1/1/1
 description Internet connection network BLUE
 ipv4 address 142.1.2.1 255.255.255.252
!
interface tunnel 1001
 description BGP-OVERLAY-NETWORK-101
 ipv4 unnumbered loopback 0
 tunnel mode gre multipoint
 tunnel source gigabitethernet 1/1/1/0
 tunnel network-id 101 [gateway 164.1.2.2] [weight 60] [qos bar1]   ~40
 tunnel protection ipsec profile BAR
!
interface tunnel 1002
 description BGP-OVERLAY-NETWORK-280
 ipv4 unnumbered loopback 0
 tunnel mode gre multipoint
 tunnel source gigabitethernet 2/1/1/1
 tunnel network-id 280 [gateway 142.1.2.2] [weight 40] [qos bar2]   ~42
 tunnel protection ipsec profile BAR
!
```

```
!
 description static tunnel mapping for RR site                                       44
 overlay map 192.168.1.3 transport 164.1.3.1 network-id 101 [weight 70]  ~
 overlay map 192.168.1.3 transport 142.1.3.1 network-id 280 [weight 30]  ~46
!
```

```
!
router bgp 1
 ...
 address-family ipv4 unicast
  neighbor 192.168.1.3 activate
  ...
!
```

VIRTUAL PRIVATE NETWORK FORWARDING AND NEXTHOP TO TRANSPORT MAPPING SCHEME

TECHNICAL FIELD

This disclosure relates in general to the field of communications networks and, more particularly, to techniques for enabling virtual private network ("VPN") forwarding and nexthop to transport mapping in such networks.

BACKGROUND

A current Dynamic Multipoint VPN ("DMVPN") schemes requires Internet Protocol ("IP") routing peering per multipoint Generic Routing Encapsulation ("mGRE") tunnel and each tunnel endpoint is required to be on the same subnet of all of the remote sites. Next Hop Resolution Protocol ("NHRP") is required to be used as the mapping service and can create a network bottleneck in large networks. Using a number of routing protocols for controlling routing in a VPN complicates the current DMVPN implementation, as each routing protocol has a specific (and unique) manner in which it works in DMVPN.

A VPN may be used to extend a private network owned by a customer across a public network, which may be owned and managed by an Internet Service Provider ("ISP"). VPNs enable network devices to send and receive data across the public network as if it were directly connected to the private network, while reaping the benefits provided by the ISP. A VPN is created by establishing one or more virtual point-to-point connections through use of encryption, tunneling protocols and/or dedicated connections. VPNs may be used to securely connect geographically separated sites of a customer, creating one cohesive network.

Because VPNs using the DMVPN scheme do not exchange routing information with Internet Service Providers ("ISPs"), the transport address, or Non-Broadcast Multiple Access ("NBMA") address, is not in the border router's Routing Information Base ("RIB"), or "routing table," making it difficult to select the correct link on which to transmit a tunneled packet when the router is connected to more than one ISP network connected.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes configuring on a network element a first tunnel from the network element to a first network, wherein the configuring comprises mapping a nexthop address of the local network element to a transport address of the tunnel on the network to create a first nexthop-to-transport mapping for the network element; and advertising the first nexthop-to-transport mapping along with routing information for the network element to remote network elements. In certain embodiments, the configuring further comprises associating a network ID of the first network with the first nexthop-to-transport mapping. The advertising may be performed using a routing protocol, such as Border Gateway Protocol ("BGP"), in which case the method may further comprise establishing a static mapping of a nexthop address of a remote route reflector ("RR") element to a transport address of the RR element, wherein the static mapping is maintained at the network element. The first network may be an ISP network and a tunnel ID and/or a weight may be associated with the first nexthop-to-transport mapping.

In some embodiments, the method may further include configuring on the network element a second tunnel from the network element to a second network, wherein the configuring of the second tunnel comprises mapping a nexthop address of the local network element to a transport address of the second tunnel on the second network to create a second nexthop-to-transport mapping for the network element; and advertising the second nexthop-to-transport mapping along with routing information for the network element to remote network elements. The configuring of the second tunnel further may include associating a network ID of the second network with the second nexthop-to-transport mapping.

Example Embodiments

Each VPN typically runs routing protocols inside the corresponding customer's routing and address space. The routing prefixes and nexthops reside at remote sites reachable through ISPs or ISP VPN services. Once a router at the local site is aware of a transport address of a router at a remote site (which transport address is within the ISPs address space), the local router can build an IP tunnel to the remote site using the transport address. The current DMVPN scheme uses the NHRP to perform for nexthop to transport address (or simply "nexthop to transport") mapping.

Another special requirement of such a VPN is that the routing for transport addresses from ISPs is usually not in the customer border routers. The VPN does not run IGP or BGP with the ISPs. When multiple ISPs service a VPN, a default route cannot be used to reach the transport addresses and the VPN cannot assume that a tunneled packet will be delivered through any ISP and with expected bandwidth or qualities. A local VPN router knows, when connecting to an ISP, what link belongs to which ISP.

Figure 1:
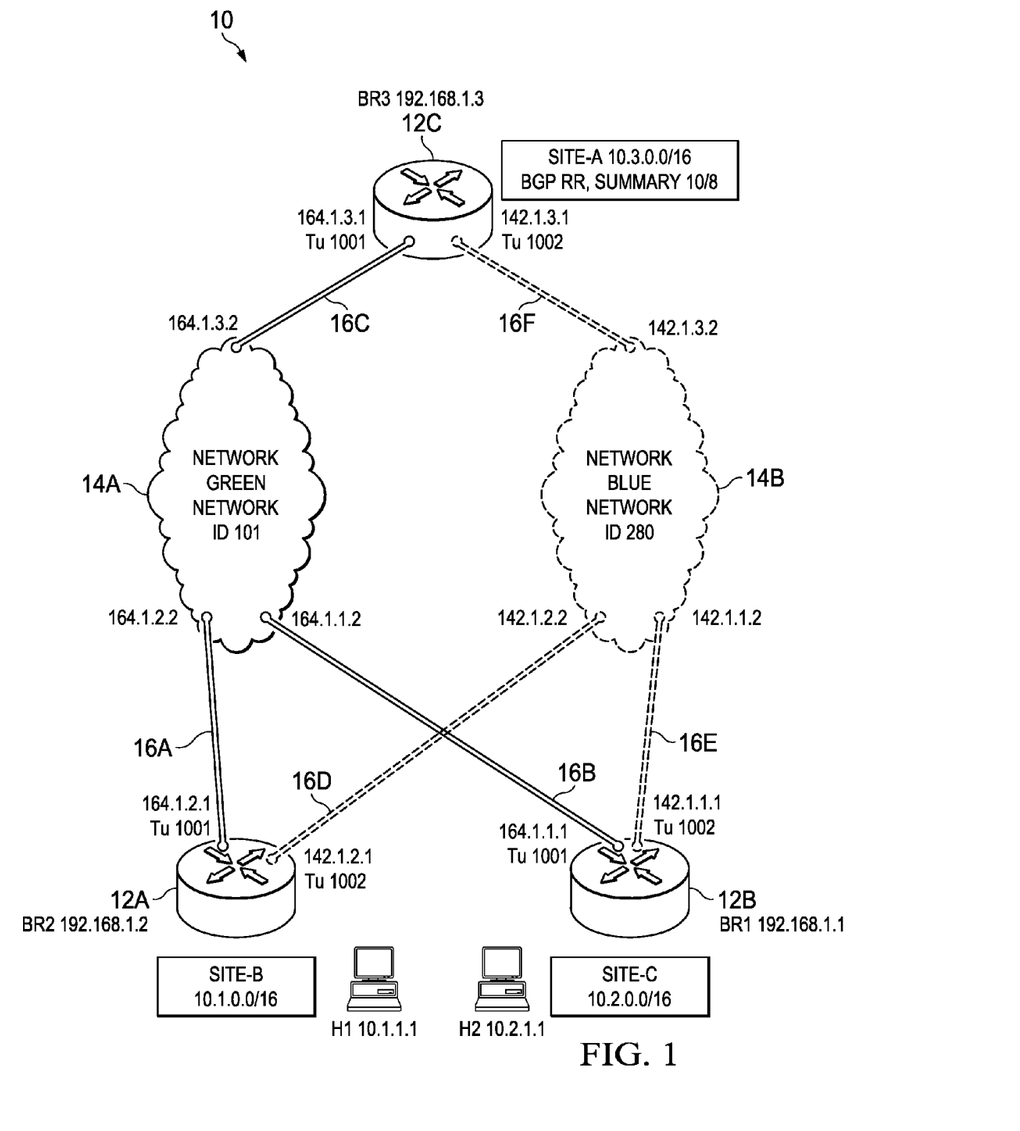
FIG. 1 is a simplified block diagram of a system in which a technique for a generic VPN forwarding and nexthop to transport mapping in accordance with embodiments described herein may be implemented.

FIG. 1 is a simplified block diagram of an example communications system 10 in which a generic VPN forwarding and nexthop-to-transport mapping scheme may be implemented in accordance with embodiments described herein. As shown in FIG. 1, the network 10 includes a plurality of routers 12A-12C interconnected via networks 14A and 14B. Each network 14A, 14B, represents a series of points, nodes, or network elements of interconnected communication paths for receiving and transmitting packets of information that propagate through a communication system. A network offers a communicative interface between sources and/or hosts, and may be any local area network ("LAN"), wireless local area network ("WLAN"), metropolitan area network ("MAN"), Intranet, Extranet, Internet, WAN, virtual private network ("VPN"), or any other appropriate architecture or system that facilitates communications in a network environment depending on the network topology. A network can include any number of hardware or software elements coupled to (and in communication with) each other through a communications medium. In some embodiments, a network may simply include a cable (e.g., an Ethernet cable), air, or other transmission medium.

In one particular instance, networks 14A, 14B, may be ISP networks associated with a service provider deployment. In other examples, the architecture of the present disclosure would be equally applicable to other communication environments, such as an enterprise WAN deployment. The architecture of the present disclosure may include a configuration capable of transmission control protocol/internet protocol ("TCP/IP") communications for the transmission and/or reception of packets in a network. Network elements, such as those comprising networks 14A and 14B, may be any device or system operable to forward traffic in conjunction with customized rules. For example, network elements may include network switches, routers, servers (physical servers or servers virtually implemented on physical hardware), machines (physical machine or machines virtually implemented on physical hardware), end user devices, access points, cable boxes, gateways, bridges, loadbalancers, firewalls, inline service nodes, proxies, processors, modules; other suitable devices, components, elements, proprietary appliances, or objects operable to exchange, receive, and transmit information in a network environment; or a combination of two or more of these. A network element may include any suitable hardware, software, components, modules, interfaces, or objects that facilitate operations associated with utilizing user-specified access control lists in conjunction with redirection and load-balancing. This may be inclusive of appropriate algorithms and communication protocols that allow for the effective exchange of data or information. Network element may be deployed in a data center, as an aggregation node (to aggregate traffic from a plurality of access domains), within a core network, or in other suitable configuration.

A network element may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein. The components of the one or more computer systems may comprise any suitable physical form, configuration, number, type, and/or layout. Where appropriate, one or more computer systems may be unitary or distributed, span multiple locations, span multiple machines, or reside in a cloud, which may include one or more cloud components in one or more networks.

Referring again to FIG. 1, for purposes of example, it will be assumed that a network ID of network 14A is 101 and a network ID of network 14B is 280. For purposes of illustration, it will be assumed that each of the routers 12A, 12B, may be configured as a Border Gateway Protocol ("BGP") client and that router 12C may be configured as a BGP route reflector ("RRs"). Router 12A is located at a site designated as "Site-B", which corresponds to a prefix 10.1.0.0/16. A host H1, having an IP address 10.1.1.1, is connected to networks 14A, 14B, via router 12A. Similarly, router 12B is located at a site designated as "Site-C", which corresponds to a prefix 10.2.0.0/16. A host H2, having an IP address 10.2.1.1, is connected to networks 14A, 14B, via router 12B. Router/RR 12C is located at a site designated as "Site-A", which corresponds to a prefix 10.3.0.0/16. For purposes of example, it will be assumed that an IP address of router 12A is 192.168.1.2, an IP address of router 12B is 192.168.1.1, and an IP address of router 12C is 192.168.1.3.

In general, an IP point-to-multipoint ("p2mp") tunnel may be configured for each ISP facing link of routers 12A-12C. Each of these links, represented in FIG. 1 by links 16A-16F is connected to either network 14A (network-id 101) or network 14B (network-id 208). In the illustrated example, links 16A-16C are connected to network 14A/network-id 101 and links 16D-16F are connected to network 14B/network-id 280. For purposes of the current example, it will be assumed that no dynamic routing protocol with ISP is run over the links and no information regarding how to reach the transport address is provided. In this example, each tunnel can be configured to use the link nexthop address, which can be the gateway address to the respective network. For example, the nexthop address for a tunnel over link 16A would be 164.1.2.2; the nexthop address for a tunnel over link 16B would be 164.1.1.2. As described in greater detail hereinbelow, an optional "weight" parameter can be used for dynamic mapping to advertise out for the inbound traffic engineering ("TE"). For example, a p2mp tunnel over link 16D may be configured using the following:

tunnel network-id 280 [gateway 142.1.2.2] [weight 50]

Static tunnels may be configured over each of the links in the above-described manner to define how to forward a VPN tunneled packet from a local VPN site (e.g., Site-B) to remote VPN sites (e.g., Site-A).

Referring again to FIG. 1, as noted above, site C has a prefix 10.2.0.0/16 and the VPN nexthop address is 192.168.1.1. For purposes of another example, it will be assumed that we know the mapping of this nexthop to transport address (e.g., 164.1.1.1), then all of the information is available to allow a local router (e.g., router 12A) forwarding a packet from host H1 to prefix 10.2.0.0/16 to reach the remote host on 10.2.0.0/16. The router 12A may be statically configured to achieve a static IP route ("ip route 10.2.0.0/16 192.168.1.1") by configuring a static nexthop to transport mapping:

overlay map 192.168.1.1 transport 164.1.1.1 network-id 101

With the above static IP routing and static nexthop to transport address mapping, a process tunnel management module at the router 12A (described in greater detail below) will install a tunnel adjacency that includes the tunnel source IP address as the ISP gateway address of 164.1.2.2, and the tunnel destination address of remote transport address of 164.1.1.1, such that the tunnel does not need to do another lookup and packets can be directly sent out on the link. The layer 2 MAC address of the link gateway may also be included in the adjacency encapsulation. The tunnel management module also installs the routing nexthop address in the Routing Information Base ("RIB") to point to the newly created tunnel adjacency, which is the tuple of [tunnel-interface-name, transport-address]. The static route for 10.2.0.0/16 with nexthop of 192.168.1.1 will be installed by the normal static routing process. The complete forwarding chain of 10.2.0.0/16 Forwarding Information Base ("FIB") lookup to the nexthop and to the adjacency will be combined such that the FIB lookup for 10.2.0.0/16 points to the adjacency described above and being encapsulated with the IP tunnel and also the layer 2 MAC and being sent out to the gateway of the network 14A. The remote site (Site-C in this example) can be similarly configured to point back to the local site (Site-B in this example), at which point the bidirectional routing and overlay of tunneling across network 14A will function.

It will be noted that static IP routing and static nexthop to transport mapping, such as described in the two examples above, may not be optimal for a large enterprise VPN network, in which static routing and mapping may prove too cumbersome for the large number of routers included in the network. In such situations, a routing protocol may be employed to achieve the above-described results by dynamically exchanging nexthop to transport mapping information along with the routing information typically exchanged by the routing protocol among all of the sites. In one embodiment, BGP is used as the routing protocol for exchanging nexthop to transport mapping information along with routing information in the system 10. In this embodiment, routers 12A and 12B are each configured as a BGP client and router 12C is configured as a BGP Route Reflector ("RR"). As will be described, routers 12A and 12B advertise local prefixes to the RR 12C; additionally, in accordance with features shown and described herein, routers 12A and 12B advertise their local routing nexthop to transport address mapping to the RR 12C. Using the above-described example, a tunnel management module at router 12A will inform BGP of the router's local nexthop address, which is the tunnel unnumbered interface (usually router's loopback address), the tunnel's physical link IP address, which is the transport address remote sites need to use for tunneling to the router 12A/Site-B, the tunnel "network-id," and "weight" number. BGP will advertise this local mapping information, along with the typical routing information advertised using BGP, through the RR to all the other sites/routers so that static mapping, as described in the above-example, can be avoided. A "tunnel type" can also be advertised in the same manner to specify a tunneling protocol (e.g., GRE, VxLAN, NVGRE, LISP, GUE) expected to be used.

Figure 2:
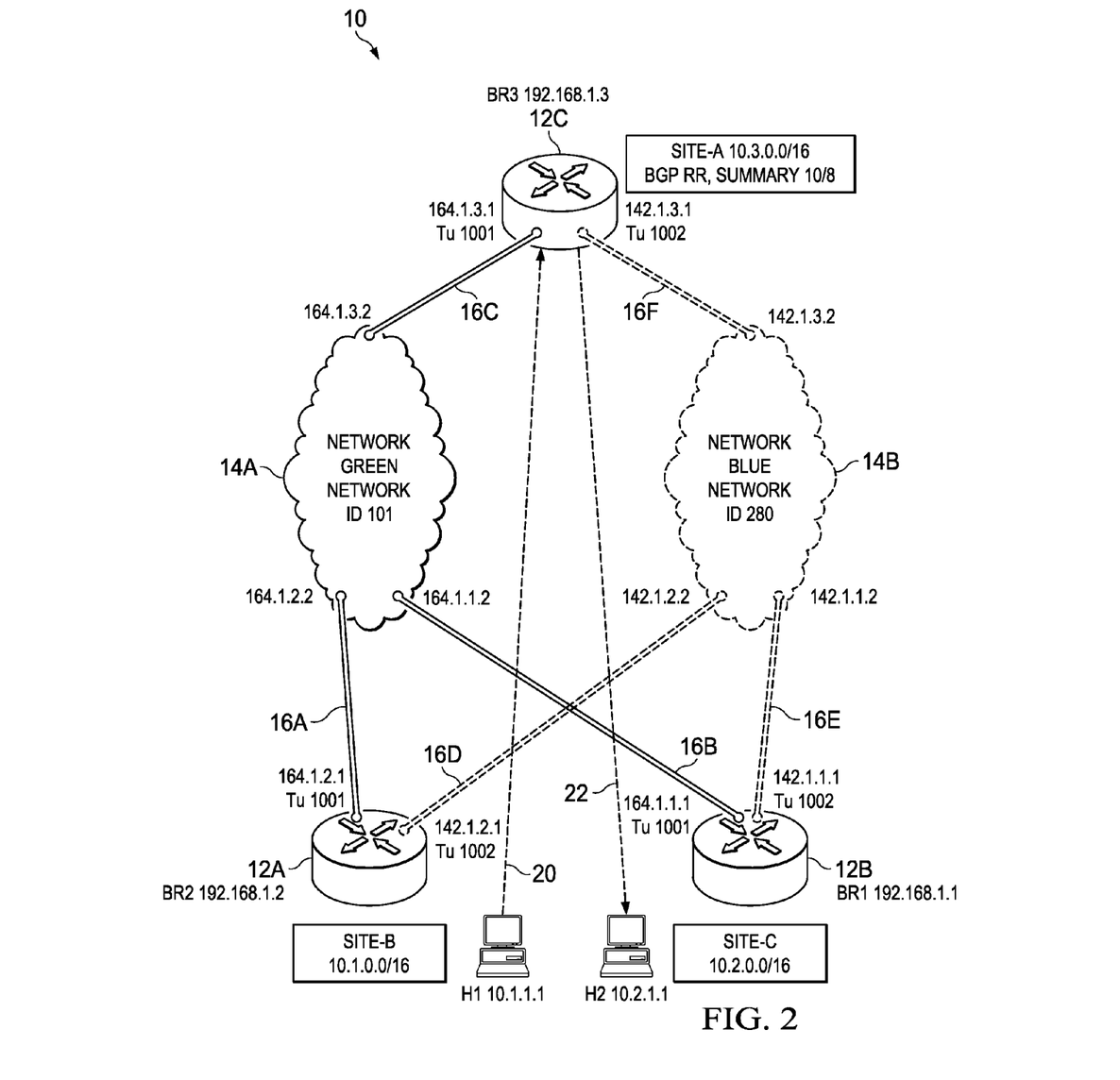
FIG. 2 is a simplified block diagram of the system of FIG. 1 illustrating operation of a technique for a generic VPN forwarding and nexthop to transport mapping in accordance with embodiments described herein may be implemented.
Figure 3:
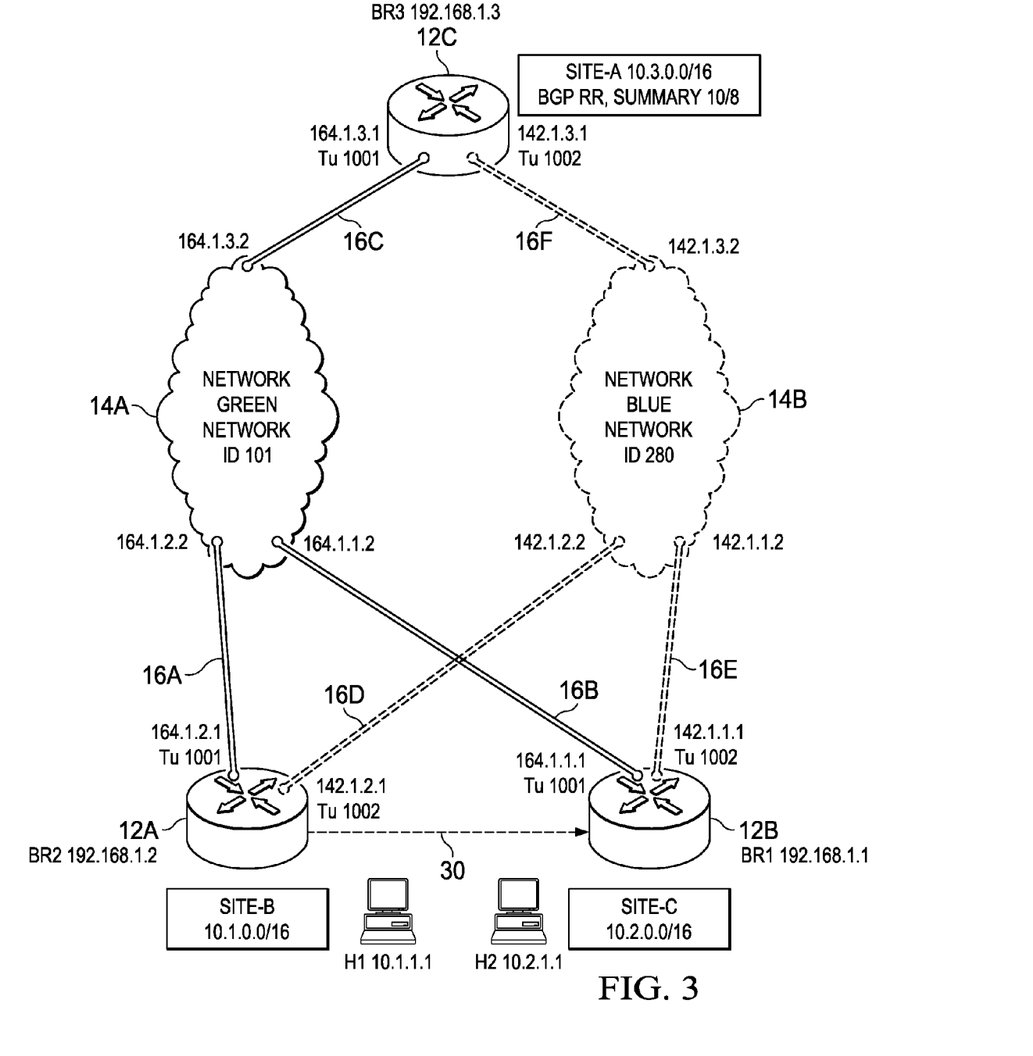
FIG. 3 is another simplified block diagram of the system of FIG. 1 illustrating operation of a technique for a generic VPN forwarding and nexthop to transport mapping in accordance with embodiments described herein may be implemented.

Example operation of a generic VPN forwarding and nexthop to transport mapping system will now be described in greater detail with reference to FIGS. 1-3. It will be assumed for the sake of the example operation illustrated in FIG. 1-3 that each of the routers 12A and 12B are BGP routers that have static mapping to router 12C, which functions as a route reflector ("RR") for the system 10. Router 12A learns from RR 12C that Site-C has 10.2/16 with the nexthop 192.168.1.1. Router 12A further learns from RR 12C that nexthop 192.168.1.1 is reachable via two connections, including a first connection via network 14A (network-id 101) corresponding to transport address 164.1.1.1 and a second connection via network 14B (network-id 280) corresponding to transport address 142.1.1.1. Router 12A is aware that it has two tunnels, including a first tunnel Tu 1001 connecting to network 14A via the link 16A and a second tunnel Tu 1002 connecting to network 14B via the link 16D.

To initiate a BGP session from router 12A to router 12C, a packet will be sent with the source address 192.168.1.2, and the destination address 192.168.1.3. The forwarding lookup on router 12A will point to tunnel adjacency (e.g., network 14A) with tunnel source 164.1.2.1 and tunnel destination 164.1.3.1 and the packet will be sent out on the link to network 14A. Although router 12A has static knowledge of RR's 12C nexthop to transport mapping, but RR 12C does not have any knowledge of the router 12A's VPN address to transport address mapping. To bootstrap this at RR 12C, as well as to explore the "Network Address Translation" ("NAT") device, router 12A sends a tunneled packet with a GRE header followed by an "Network Service Header" ("NSH") meta-data containing the local transport address mapping (a NAT explore service).

RR 12C now knows the transport address mapping for router 12A and will send back the tunneled packet with the NSH header containing post-NAT transport address, if it is detected. A BGP session can then be established. RR 12C will also advertise summary routes with a special community string. BGP will only download more specific routes of the nexthop to the remote site with the dynamic tunnel being up. It will be assumed for the sake of example that at this point, host H1 (10.1.1.1) sends a packet to host H2 (10.2.1.1) at Site-C. The packet will first hit the 10/8 summary route on the router 12A and be sent to RR 12C for relay, as shown in FIG. 2 by a path indicated by arrows 20, 22. In the meantime, the packet is copied and punted to the tunnel module at router 12A for resolution. The tunnel module will ask BGP, which advises that the nexthop for 10.2.1.1 is 192.168.1.1 and mapping to transport 164.1.1.1. The tunnel module at router 12A installs an adjacency for this, as illustrated in FIG. 3 by an arrow 30, and installs the 192.168.1.1/32 to point to the tunnel adjacency. RIB will inform BGP that the nexthop 192.168.1.1 is resolved, BGP will download 10.2/16 into RIB, and FIB will redirect the traffic to 10.2.1.1 to the newly established dynamic tunnel. Traffic returning from router 12B to router 12A will thereafter take the direct tunnel 30 without going through summary router due to the NSH metadata containing the information for router 12B to setup with tunnel adjacency back to router 12A.

Figure 4:
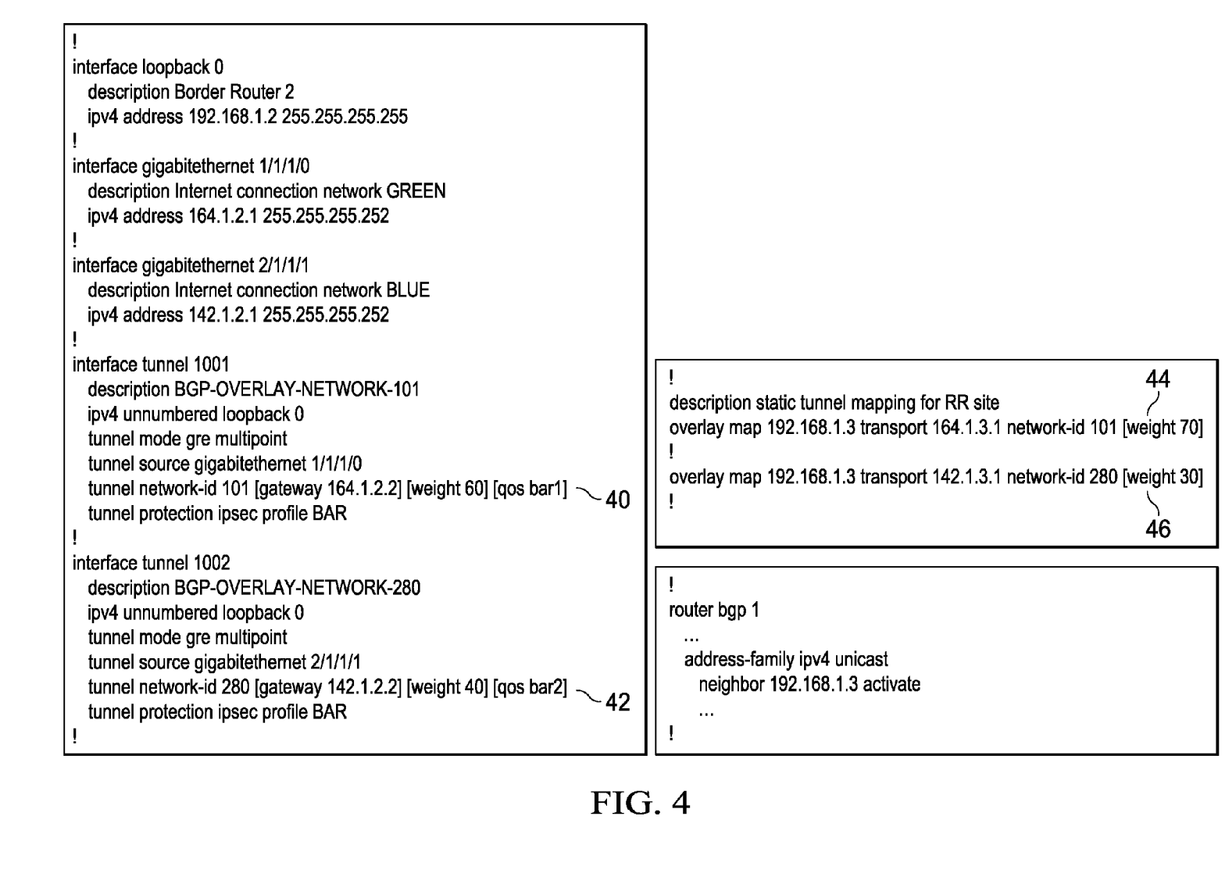
FIG. 4 illustrates a portion of a Command Line Interface ("CLI") file for configuring a router comprising a network element of the system of FIG. 1 in accordance with embodiments described herein for implementing a generic forwarding and nexthop to transport mapping technique.

FIG. 4 illustrates an example command line interface ("CLI") configuration of a router for implementing embodiments of a generic VPN forwarding and nexthop to transport mapping system as described herein. The illustrated example shows CLI configuration for router 12A of FIGS. 1-3. For example, under each p2mp tunnel interface, a command line "tunnel network-id X [gateway x.x.x.x] [weight y]" may be entered. Referring to FIG. 4, under "interface tunnel 1001," which defines the tunnel from router 12A to network 14A, a line designated by reference numeral 40 indicates that the transport address for router 12A on network 14A (network-id 101) is 164.1.2.2 and has a weight of 60%. Similarly, under "interface tunnel 1002," which defines the tunnel from router 12A to network 14B, a line designated by a reference numeral 42 indicates that the transport address for router 12A on network 14B (network-id 280) is 142.1.2.2 and has a weight of 40%. These two entries establish the mapping of interface IP address 192.168.1.2 to transport address 164.1.2.2 for network 14A and to transport address 142.1.2.2 for network 14B. Additionally, global static remote tunnel transport mapping may be established using the following format:

overlay map x.x.x.x transport y.y.y.y network-id X [weight Z]

Specifically, as shown in FIG. 4, static tunnel mapping for the RR (router 12C) via each network 14A, 14B, is specified by command lines designated by reference numerals 44 and 46, respectively. In particular, command line 44 ("overlay map 192.168.1.3 transport 164.1.3.1 network-id 101 [weight 70]") establishes a mapping of RR 12C's nexthop address 192.168.1.3 to transport address 164.1.3.1 for network 14A (with a weight of 70%). Similarly, command line 46 ("overlay map 192.168.1.3 transport 142.1.3.1 network-id 280 [weight 30]") establishes a mapping of RR 12C's nexthop address 192.168.1.3 to transport address 142.1.3.1 for network 14B (with a weight of 30%). It will be noted that this global static remote tunnel transport mapping for the RR is not needed if the RR is in the cloud.

In order to carry the overlay mapping information in BGP, several enhancements to BGP protocol, as described in Internet Engineering Task Force ("IETF") Request for Comments ("RFC") 5512 entitled "The BGP Encapsulation Subsequent Address Family Identified (SAFI) and the BGP Tunnel Encapsulation attribute" ("IETF RFC 5512"), are proposed to enable use of the Tunnel Encapsulation attribute, which is attached to a BGP host address Network Layer Reachability Information ("NLRI"), to map a BGP nexthop to one or more tunnel connections.

Figure 5:
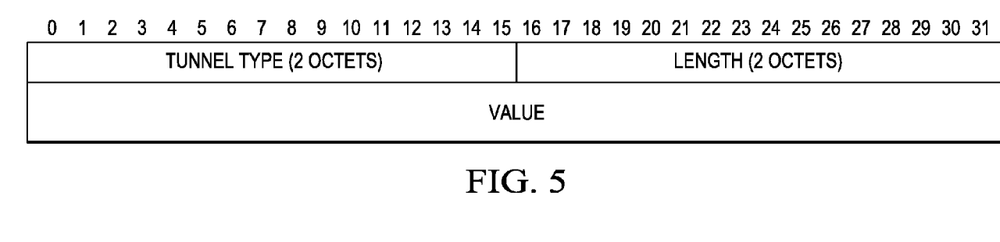
FIG. 5 illustrates the BGP Tunnel Encapsulation Attribute specified in RFC 5512 that may be used in implementing a technique for a generic VPN forwarding and nexthop to transport mapping in accordance with embodiments described herein may be implemented.

FIG. 5 illustrates the structure of the Tunnel Encapsulation attribute as described in IETF RFC 5512. The Tunnel Encapsulation attribute is an optional transitive attribute that is composed of a set of Type-Length-Value (TLV) encodings. The type code of the attribute is 23. Each TLV contains information corresponding to a particular tunnel technology.

A Tunnel Type field is 2 octets identifying the type of tunneling technology being signaled. IETF RFC 5512 defines the following tunnel types:

L2TPv3 over IP [RFC3931]: Tunnel Type=1
RE [RFC2784]: Tunnel Type=2
IP in IP [RFC2003] [RFC4213]: Tunnel Type=7
Unknown types are to be ignored and skipped upon receipt.

A Length field is 2 octets identifying the total number of octets of a Value field. The Value field is of variable length and is comprised of multiple sub-TLVs. Each sub-TLV consists of three fields, including a 1-octet type field, a 1-octet length field, and zero or more octets of value.

Referring to FIG. 5, a tunnel type field 60 currently enables definition of three tunnel types, one of which is GRE, which may be used for tunnels employed herein. One of the aforementioned enhancements include defining a new "Tunnel Endpoint" sub-TLV for the "Tunnel Encapsulation Attribute." The Tunnel Endpoint sub-TLV includes a 2 byte address family identifier ("AFI") and the AFI-related transport IP address or tunnel-endpoint IP address (in ISP's address space) (4 bytes for an IPv4 address or 16 bytes for an IPv6 address). Another enhancement includes repurposing an already-defined sub-TLV "Color" as a "Network ID" sub-TLV, which is a 4 byte value that designates the network by "network-id". Yet another enhancement includes definition of a "Weight" sub-TLV, which is a 2 byte value used for BGP inbound TE purposes. Also defined are "Global Site-ID" subTLV, which is a 8 byte value, 4 bytes of which identify the Autonomous System ("AS") number and 4 bytes of which identify site number, a QoS profile sub-TLV, which is 1-255 bytes identifying a QoS profile name string of the link without null terminator; a "Geo Location" sub-TLV, which is a 12 byte field indicating latitude, longitude and altitude data for router location used by BGP best path calculation for optimized DMZ and any cast routers; and a "Link Capability" sub-TLV, which is a 4 byte value, the first bit of which indicates the router and inbound of the tunnel supports SGT identification and propagation.

The Tunnel Encapsulation attribute with the Tunnel Endpoint sub-TLV described above can be used in a route advertisement using the IPv4/IPv6 unicast address family for carrying a nexthop host route to the tunnel/transport mapping. Another approach for carrying the nexthop address to the tunnel/transport mapping is to use the Tunnel SAFI defined in RFC 5512 with a new "reverse mapping" sub-TLV listing the host addresses in the format of (AFI, host address).

Figure 6:
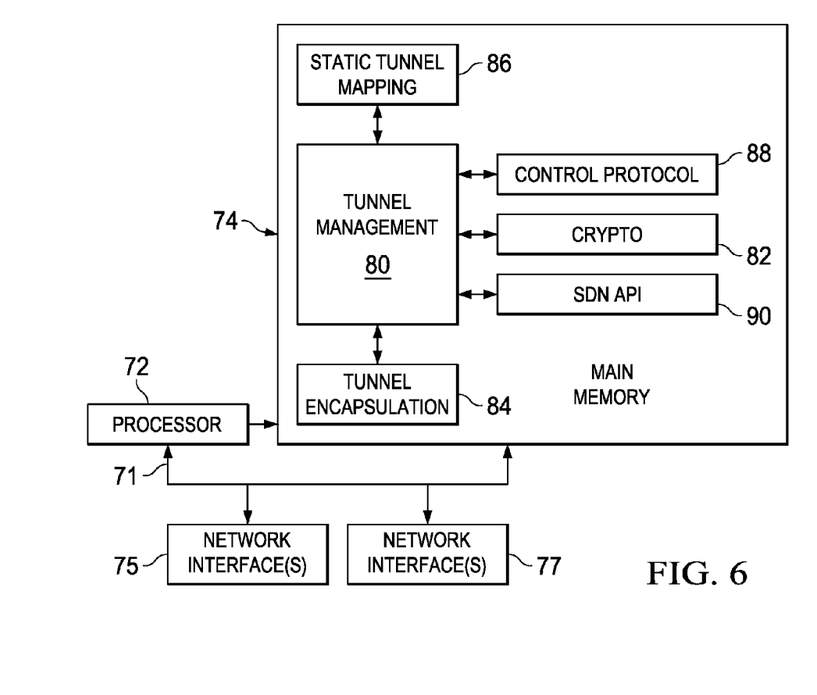
FIG. 6 illustrates a machine comprising an element of the system of FIG. 1 for implementing a technique for a generic VPN forwarding and nexthop to transport mapping in accordance with embodiments described herein.

Turning to FIG. 6, FIG. 6 is a simplified block diagram of an example machine (or apparatus) 70 that may be implemented as an element of a system for use in implementing a technique for enabling dynamic update of network device data models in accordance with embodiments described herein. The example machine 70 corresponds to network elements and computing devices that may be deployed in system 10, including, for example, routers 12A-12C. In particular, FIG. 6 illustrates a block diagram representation of an example form of a machine within which software and hardware cause machine 70 to perform any one or more of the activities or operations discussed herein. As shown in FIG. 6, machine 70 may include a processor 72, a main memory 74, and one or more network interfaces, represented in FIG. 6 by network interface 75. A bus 71, such as a system bus and a memory bus, may provide electronic communication between processor 72 and the memory, drives, interfaces, and other components of machine 70.

Processor 72, which may also be referred to as a central processing unit ("CPU"), can include any general or special-purpose processor capable of executing machine readable instructions and performing operations on data as instructed by the machine readable instructions. Main memory 74 may be directly accessible to processor 72 for accessing machine instructions and may be in the form of random access memory ("RAM") or any type of dynamic storage (e.g., dynamic random access memory ("DRAM")). Main memory 74 may include any non-volatile memory such as a hard disk, which is capable of storing electronic data including executable software files. Main memory 74 may also comprise a removable media drive through which externally stored electronic data may be provided to machine 70 and which may be configured to receive any type of external media such as compact discs ("CDs"), digital video discs ("DVDs"), flash drives, external hard drives, etc. Removable media drive represents a drive configured to receive any type of external computer-readable media. Instructions embodying the activities or functions described herein may be stored on one or more external computer-readable media. Additionally, such instructions may also, or alternatively, reside at least partially within a memory element (e.g., in main memory 74 or cache memory of processor 72) of machine 70 during execution, or within a non-volatile memory element of machine 70. Accordingly, other memory elements of machine 70 also constitute computer-readable media. Thus, "computer-readable medium" is meant to include any medium that is capable of storing instructions for execution by machine 70 that cause the machine to perform any one or more of the activities disclosed herein.

Network interfaces 75, which may comprise one or more of wireless, wired and/or virtual interfaces, may be provided to enable electronic communication between machine 70 and other machines via networks (e.g., networks 14A, 14B). In one example, network interfaces 75 could include a wireless network controller ("WNIC") with suitable transmitting and receiving components, such as transceivers, for wirelessly communicating within a network. Network interfaces 75 may also include a wired network interface, which may enable machine 70 to physically connect to a network by a wire line such as an Ethernet cable. Both wireless and wired network interfaces may be configured to facilitate communications using suitable communication protocols such as, for example, Internet Protocol Suite ("TCP/IP"). Machine 70 is described as including both wireless and wired network interfaces for illustrative purposes only. While one or more wireless and hardwire interfaces may be provided in machine 70, or externally connected to machine 70, only one connection option is needed to enable connection of machine 70 to a network.

A user interface 77 may be provided in some machines to allow a user to interact with the machine 70. User interface 77 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Not shown in FIG. 6 is additional hardware that may be suitably coupled to processor 72 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 70 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 70 to appropriately manage the operation of the hardware components therein.

In accordance with features of one embodiment, and as illustrated in FIG. 6, main memory 74 may include a plurality of modules for implementing various features of embodiments described herein. In particular, a tunnel management module 80 is provided for interacting with the other modules (to be described) and coordinating functions provided by those modules, which may be implemented as plug-ins. A crypto module 82 is provided for providing IP stack encryption with a crypto keying mechanism of any type (e.g., IKE, KGS, GETVPN, etc.). A tunnel encapsulation module 84 is provided for implementing tunnel encapsulation for the system. In embodiments illustrated herein, GRE encapsulation is implemented, but it will be recognized that other types of encapsulation (VxLAN, GUE, etc.) may be advantageously employed as well. Mapping from VPN address to tunnel transport address is related to the type of tunnel encapsulation being employed. A static tunnel mapping module 86 supports static tunnel mapping from one site to another. Static mapping was illustrated above with reference to a local router to a remote RR, but it can be used for any site-to-site mapping. A routing protocol module 88 is provided for routing and mapping. Examples described herein employ BGP as the routing protocol; however, other types of protocols (such as OSPF) may also be employed without departing from the spirit of embodiments described herein. An SDN controller 90 may be provided to maintain routing and tunnel connection information; in this case, instead of querying BGP for routing/mapping information, the SDN controller 90 would be queried by the tunnel management module 80. It will be recognized that all of the modules 82-90 are plug and play; as long as they conform to a tunnel management module API, they will functio9n in accordance with embodiments described herein.

The elements, shown and/or described with reference to machine 70, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities related to the system described herein may be implemented in software in, for example, routers 12A-12C. In some embodiments, this software could be received or downloaded from a web server, provided on computer-readable media, or configured by a manufacturer of a particular element in order to provide features of embodiments described herein. In some embodiments, one or more of these features may be implemented in hardware, provided external to these elements, or consolidated in any appropriate manner to achieve the intended functionality.

In one example implementation, routers 12A-12C are network devices or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 74) can store data used for the automatic configuration and registration operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 72) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of system 10 may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by system 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Figure 7:
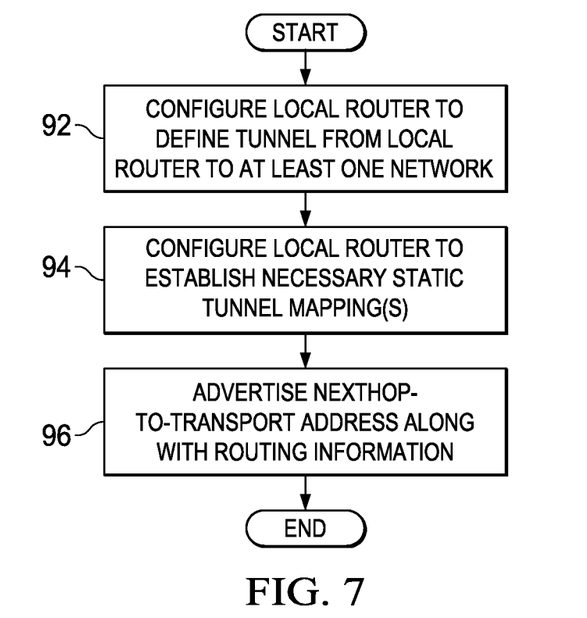
FIG. 7 is a flow diagram illustrating an example implementation of implementing a technique for a generic VPN forwarding and nexthop to transport mapping in accordance with embodiments described herein.

FIG. 7 is a flow diagram illustrating an example implementation of implementing a technique for a generic VPN forwarding and nexthop to transport mapping in accordance with embodiments described herein. As shown in FIG. 7, in step 92, a local router is configured to define a tunnel from the local router to one or more networks, which may comprise ISP networks. The tunnel definition may include one or more of a network-id identifying the network, a transport address of the network gateway to which the router is connected, and a weight. In step 94, the local router is configured to establish any necessary static tunnel mapping. For example, in embodiments descried above, static tunnel mapping to the RR for the local router via one or more networks, which may be ISP networks, is established. The static tunnel mapping may include one or more of a nexthop address for the router, a network-id identifying the transport network, a transport address for the router on the transport network, and a weight. In step 96, nexthop to transport address mapping information configured in steps 92 and 94 is advertised along with routing information. In certain embodiments, BGP is used to advertise both sets of information.

Figure 8A:
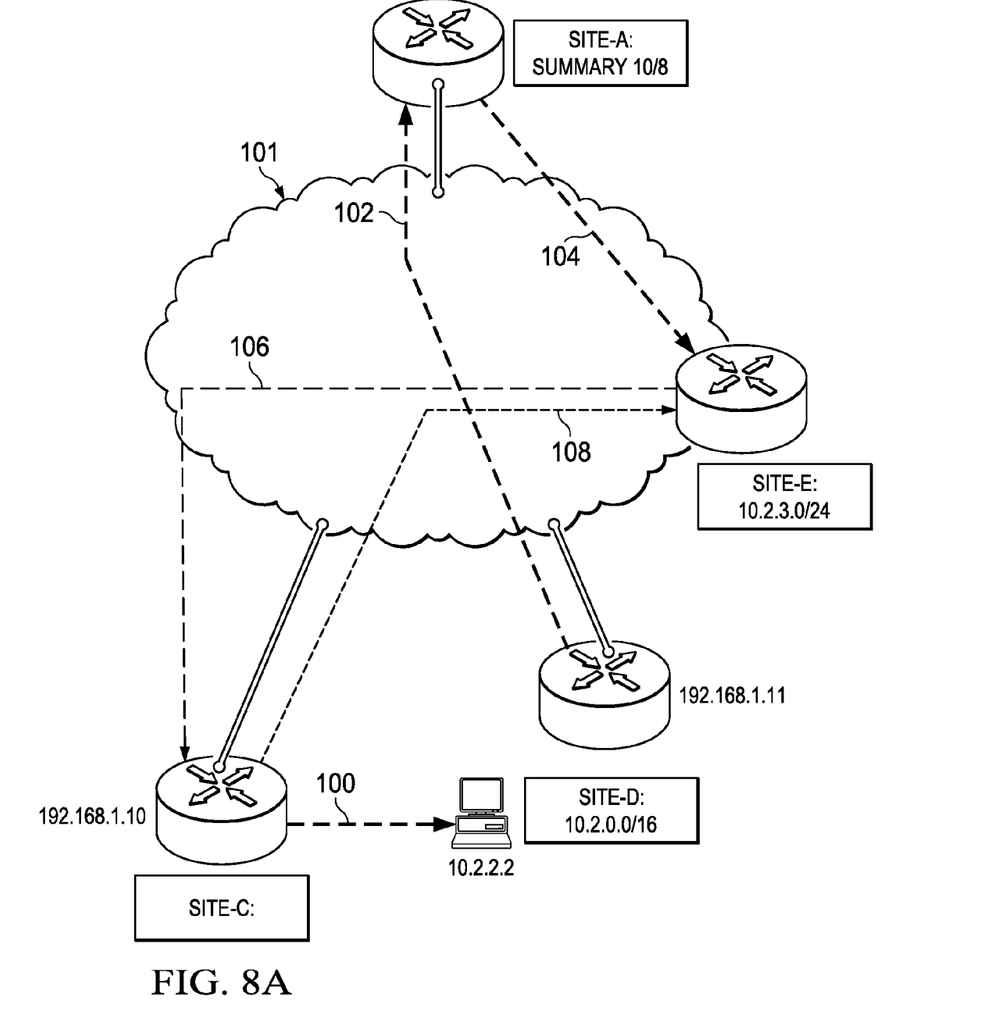
FIG. 8A illustrates an example use case of a technique for handling overlapping addresses in accordance with embodiments described herein.

FIG. 8A illustrates addressing a situation that may be referred to as "address overlap". Referring to FIG. 8A, it will be assumed that Site-C already has installed the route 10.2/16 and traffic going to Site-D following 10.2.0.0/16, as represented in FIG. 8A by an arrow designated by a reference numeral 100. It will be further assumed that Site-E later pulls up a more specific route 10.2.3.0/24. Site-D owns this 10.2.0.0/16 covering prefix; therefore, BGP can detect this condition and installs a special route of 10.2.3.0/24 that points toward Site-A to relay the traffic. As a result, Site-C now sends traffic to 10.2.3.4 following the routing to Site-D. Site-D, which has the above-installed route, relays the traffic to Site-A, as represented in FIG. 8A by an arrow designated by a reference numeral 102, and then to Site-E to reach the 10.2.3.4 host, as represented in FIG. 8A by an arrow designated by a reference numeral 104. When Site-E traffic comes back, it will be assumed that Site-E does not have a direct tunnel back to Site-C; therefore, Site-E will try and bring up the direct tunnel to Site-C while forwarding data packets through the relay site Site-A, as represented in FIG. 8A by an arrow designated by a reference numeral 106. Once the bi-directional tunnel between Site-C and Site-E is up, the nexthop to Site-E is resolved on Site-C. As a result, the traffic to 10.2.3.4 goes through the direct tunnel to Site-E, as represented in FIG. 8A by an arrow designated by a reference numeral 108.

Figure 8B:
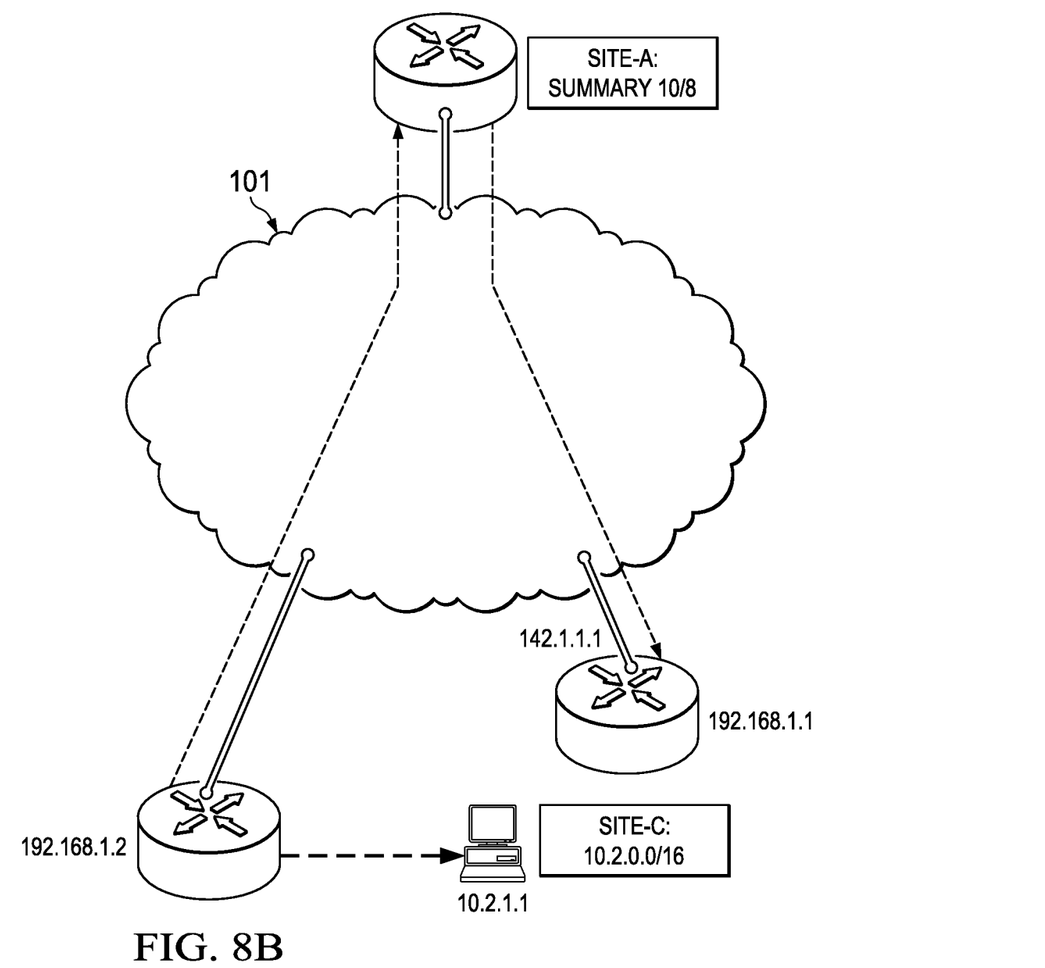
FIG. 8B illustrates an example use case of a technique for reducing resource utilization in accordance with embodiments described herein.

FIG. 8B illustrates a use case referred to herein as "push & pull". Referring to FIG. 8B, it will be noted that in cases where BGP is used to distribute routing information, BGP has all of the information (push model), but it does not need to download the information to the "Routing Information Based" ("RIB") or "Forwarding Information Base" ("FIB") until the nexthop toward the dynamic tunnel is fully established. Thus, it will consume only a small subset of resources normally required.

When traffic hits the special summary prefix at Site-A, it triggers the tunnel management module to query local BGP for more specific prefix match information (pull model) and a dynamic tunnel is set up. This combination of push and pull saves local router resources and optimizes for WAN dynamic tunnel setup, as discussed above. This is referred to as "remote push and local pull." Services type of advertisements may be different from traditional forwarding cache miss type of pulling. For example, QoS policy change for a remote site does not have anything to do with forwarding table entries; it will be a challenge for a local router to know when to pull the new information and what to pull. In this remote push and local pull model illustrated in FIG. 8B, if the local router has a dynamic tunnel to the remote site, then the updated QoS will be installed. The same procedure may be used for tracking usage. The model can be extended to completely push and completely pull, while the handling mechanism remains unchanged.

Embodiments described herein employ a network-id to be the basic forwarding construct, since each link to ISP is known to the customer and the p2mp tunnel is tied to that interface. The network-id of the tunnel is defined. When the remote site advertises its nexthop to transport address mapping, it also includes the "network-id". Thus to reach the remote site using that tunnel transport, it is clear exactly which tunnel to use and what the gateway address is, as well as the routing knowledge of those transport addresses.

Embodiments described herein are simple and modular; the forwarding scheme works with any types of tunnel, and any type of routing or mapping mechanism, including static, BGP-based, LISP-based, or others. In the BGP-based embodiments described herein, BGP is used to not only advertise routing, but also the BGP nexthop to transport address mapping, along with "network-id", tunnel encapsulation type, and weight.

In general, embodiments herein define a new scheme in which the generic VPN forwarding chain can be built upon a p2mp tunnel interface with an ISP network identifier, to allow any type of routing and routing nexthop to transport address mapping to be used for this forwarding mechanism. Even pure static IP routing and static nexthop to transport address mapping will work under the system described herein. The need to perform per tunnel interface subnet matching for all the remote site is eliminated, as, routing adjacency does not tie into a specific tunnel interface; rather, it is per routing domain on the router. This allows easy configuration and scalable deployment and is more suitable for SD-WAN. Additionally, it supports a consistent VPN forwarding scheme with modular design by decoupling the routing and mapping system and tunnel frame technology so that implementation can choose any reliable and scaling protocols and tunnel types. This also helps future tunnel frame changes and routing protocol enhancement.

Using the "network-id" to tie an ISP network with a local link and a remote transport address enables tunnel forwarding without explicit routing information about the transport addresses. Moreover, embodiments described herein do not require that all of the site tunnel end-points be on the same IP subnet, they do not require per tunnel routing adjacency with the same remote router, and they do not tie the nexthop address to transport mapping with NHRP. The embodiments do not require use of the spoke/hub concept; rather, they may use whatever is simple and scalable. In summary, it is simpler, modular, more scalable, more flexible, and includes fewer moving parts. As described above, this is modular design. The dynamic routing and dynamic tunnel mapping is optional. In the sense that a SDN controller with some python scripts can take over the complete provisioning of the enterprise WAN without any dynamic protocols. There is only one configuration in interface tunnel sub-mode, and one tunnel static mapping configuration, add on traditional static routing, the SDN controller can provision the entire WAN with those two configure primitives in generic VPN scheme.

Embodiments shown and described herein may also utilize non-routing protocols to distribute the routing and nexthop to transport mapping information to work the same for enterprise VPN. For instance, each site can register their routing information to some central database; each site can also register their routing nexthop to transport address mapping with network-id information to the same database. When a router receives a packet from a local host addressed to a remote site, the router can perform a search of the database to determine the nexthop address, as well as the transport address and network ID to which the nexthop address is mapped. This arrangement will work identically to the above-described schemes, including static configuration and BGP advertised dynamic configuration, and others. VPN segmentation naturally fits into this scheme. For VRF-Lite, each VRF has its own address space in VPN, thus the tunnel needs "tunnel-key" for GRE, or "instance-id" for other type of UDP based transport. The above routing nexthop will be VRF based, but the transport address is the same.

In one aspect, using BGP protocol as the control plane for Enterprise WAN enables the normal routing information to be offered within an Enterprise VPN network. Additionally, in accordance with embodiments described herein, BGP protocol also offers the tunnel overlay mapping information to dynamically bridge the VPN traffic an ISP network in the middle. As previously noted, embodiments described herein are generic and modular and interworks with any type of tunnel encapsulation and crypto key schemes.

In another aspect, embodiments employ a combination of message push and pull technology. In particular, a remote push and local pull scheme is used to optimize for WAN condition of not pulling from a remote site and also saving router resources by not pushing all the entries into the routing table and forwarding table.

In another aspect, embodiments described herein solve the issue of overlapping addresses for the Enterprise VPN, using BGP to dynamically detect an overlapping address condition and push a special route towards the hub site. The return traffic will bring up a bi-directional tunnel and establish the direct connection for the source and destination sites, thus resolving the overlapping address condition for the WAN network. This overlapping address condition can also occur in mobility cases, in which it is handled in a similar fashion.

In yet another aspect, embodiments described herein utilize the "Network-ID" in the scheme to indicate the local and remote tunnel association with ISP networks. With this scheme, there is no need to have explicit routing information from the ISP networks for their tunnel endpoint addresses. This simplifies the configuration and routing conflicts.

In still another aspect, embodiments described herein employ a technique of dynamic tunnel bring up. During the network initial bootstrap of a new router, the new router needs to have static mapping information for the hub or other service location site; however, on the remote side, there will be no static configuration. In accordance with embodiments described herein, the tunnel carries the NSH or other network shim header in tunnel packet to signal the remote site for the tunnel mapping information back to the local router.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein.

In still other embodiments, one or several devices may include any suitable algorithms, hardware, software, components, modules, interfaces, or objects that facilitate the operations thereof.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system as shown in the FIGURES and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    configuring on a network element a first tunnel from the network element to a first network, wherein the configuring comprises mapping a nexthop address of the network element to a transport address of the first tunnel on the first network to create a first nexthop-to-transport mapping for the network element;
    advertising the first nexthop-to-transport mapping along with routing information for the network element to remote network elements;
    detecting an overlapping address condition using Border Gateway Protocol ("BGP");
    after the detecting, pushing a special route toward a hub site; and
    automatically bringing up a bi-directional tunnel between source and destination sites to resolve the overlapping address condition.

2. The method of claim 1, wherein the configuring further comprises associating a network ID of the first network with the first nexthop-to-transport mapping.

3. The method of claim 1, wherein the advertising is performed using a routing protocol.

4. The method of claim 3, wherein the routing protocol comprises Border Gateway Protocol ("BGP") and wherein the method further comprises establishing a static mapping of a nexthop address of a remote route reflector ("RR") element to a transport address of the RR element, wherein the static mapping is maintained at the network element.

5. The method of claim 1, wherein the first network is an Internet Service Provider ("ISP") network.

6. The method of claim 1 further comprising associating a tunnel ID with the first nexthop-to-transport mapping.

7. The method of claim 1 further comprising:
    configuring on the network element a second tunnel from the network element to a second network, wherein the configuring comprises mapping a nexthop address of the network element to a transport address of the second tunnel on the second network to create a second nexthop-to-transport mapping for the network element; and
    advertising the second nexthop-to-transport mapping along with routing information for the network element to remote network elements.

8. The method of claim 1 further comprising employing a remote push and local pull model to distribute routing information.

9. One or more non-transitory tangible media that includes code for execution and when executed by a processor is operable to perform operations comprising:
    configuring on a network element a first tunnel from the network element to a first network, wherein the configuring comprises mapping a nexthop address of the network element to a transport address of the first tunnel on the first network to create a first nexthop-to-transport mapping for the network element;
    advertising the first nexthop-to-transport mapping along with routing information for the network element to remote network elements;
    detecting an overlapping address condition using Border Gateway Protocol ("BGP");
    after the detecting, pushing a special route toward a hub site; and automatically bringing up a bi-directional tunnel between source and destination sites to resolve the overlapping address condition.

10. The media of claim 9, wherein the configuring further comprises associating a network ID of the first network with the first nexthop-to-transport mapping.

11. The media of claim 9, wherein the advertising is performed using Border Gateway Protocol ("BGP") and wherein the further include establishing a static mapping of a nexthop address of a remote route reflector ("RR") element to a transport address of the RR element, wherein the static mapping is maintained at the network element.

12. The media of claim 9, wherein the operations further comprise associating one of a tunnel ID and a weight with the first nexthop-to-transport mapping.

13. The media of claim 9, wherein the operations further comprise:
configuring on the network element a second tunnel from the network element to a second network, wherein the configuring comprises mapping a nexthop address of the network element to a transport address of the second tunnel on the second network to create a second nexthop-to-transport mapping for the network element; and
advertising the second nexthop-to-transport mapping along with routing information for the network element to remote network elements.

14. The media of claim 9, wherein the operations further comprise employing a remote push and local pull model to distribute routing information.

15. An apparatus comprising:
a memory element configured to store data; and
a processor operable to execute instructions associated with the data;
wherein the processor is configured to perform operations including:
configuring on a network element a first tunnel from the network element to a first network, wherein the configuring comprises mapping a nexthop address of the network element to a transport address of the first tunnel on the first network to create a first nexthop-to-transport mapping for the network element;
advertising the first nexthop-to-transport mapping along with routing information for the network element to remote network elements;
detecting an overlapping address condition using Border Gateway Protocol ("BGP");
after the detecting, pushing a special route toward a hub site; and
automatically bringing up a bi-directional tunnel between source and destination sites to resolve the overlapping address condition.

16. The apparatus of claim 15, wherein the configuring further comprises associating a network ID of the first network with the first nexthop-to-transport mapping.

17. The apparatus of claim 15, wherein the advertising is performed using Border Gateway Protocol ("BGP") and wherein the operations further include establishing a static mapping of a nexthop address of a remote route reflector ("RR") element to a transport address of the RR element, wherein the static mapping is maintained at the network element.

18. The apparatus of claim 15, wherein the processor is further configured to associate one of a tunnel ID and a weight with the first nexthop-to-transport mapping.

19. The apparatus of claim 15, wherein the processor is further configured to:
configure on the network element a second tunnel from the network element to a second network, wherein the configuring comprises mapping a nexthop address of the local network element to a transport address of the second tunnel on the second network to create a second nexthop-to-transport mapping for the network element; and
advertise the second nexthop-to-transport mapping along with routing information for the network element to remote network elements.

20. The apparatus of claim 15, wherein the processor is further configured to employ a remote push and local pull model to distribute routing information.

* * * * *